US008244429B2

(12) United States Patent
Shibasaki et al.

(10) Patent No.: US 8,244,429 B2
(45) Date of Patent: Aug. 14, 2012

(54) BRAKE-SWITCH FAILURE DIAGNOSIS METHOD AND BRAKE-SWITCH FAILURE DIAGNOSIS SYSTEM

(75) Inventors: Masaki Shibasaki, Saitama (JP); Tetsuya Shinguchi, Saitama (JP); Takayuki Wakai, Saitama (JP); Masaaki Maeno, Saitama (JP)

(73) Assignees: Bosch Corporation, Tokyo (JP), part interest; Nissan Diesel Motor Co., Ltd., Saitama (JP), part interest ( * ) Notice: Subject to any disclaimer, the term of this patent is extended or adjusted under 35 U.S.C. 154(b) by 485 days.

(21) Appl. No.: 12/516,921

(22) PCT Filed: Nov. 29, 2007

(86) PCT No.: PCT/JP2007/073082
§ 371 (c)(1),
(2), (4) Date: Jan. 12, 2010

(87) PCT Pub. No.: WO2008/066125
PCT Pub. Date: Jun. 5, 2008

(65) Prior Publication Data
US 2010/0138105 A1  Jun. 3, 2010

(30) Foreign Application Priority Data
Nov. 30, 2006 (JP) .................................. 2006-323965

(51) Int. Cl.
*B60T 17/18* (2006.01)
*G06F 19/00* (2006.01)
(52) U.S. Cl. ..................... 701/34; 701/29.7; 303/122.03
(58) Field of Classification Search .................... 701/34, 701/29.2, 29.7, 29.8; 303/122.03, 20, 14, 303/9.62, 89; 188/226.8
See application file for complete search history.

(56) References Cited

U.S. PATENT DOCUMENTS

| 5,810,455 A * | 9/1998 | Noguchi ....................... 303/9.62 |
| 5,951,116 A * | 9/1999 | Nagasaka et al. ............... 303/14 |
| 2004/0090112 A1 * | 5/2004 | Tachiiri et al. .................. 303/20 |
| 2004/0124697 A1 * | 7/2004 | MacGregor et al. ............ 303/89 |

FOREIGN PATENT DOCUMENTS

| JP | 3090864 A | 4/1991 |
| JP | 2772737 B2 | 4/1998 |
| JP | 2003182557 A | 7/2003 |
| JP | 2003182563 A | 7/2003 |

OTHER PUBLICATIONS

Microfilm of the specification and drawings annexed to the request of Japanese Utility Model Application No. 92457/1988 (Laid-open No. 13874/1990), Nissan Diesel Motor Co., Ltd., Jan. 29, 1990.

* cited by examiner

*Primary Examiner* — Tan Q Nguyen
(74) *Attorney, Agent, or Firm* — Ronald E. Greigg

(57) ABSTRACT

Secure failure of a brake switch is enabled with a simple configuration.
When brake switches 6a and 6b are determined to be not ON together and not OFF together (S110 and S112), first and second determination counters perform count respectively (S114 and S120), and on the other hand, when the two brake switches 6a and 6b are determined to be ON together, a count value of the first determination counter is set to zero (S132), and when the brake switches are determined to be OFF together, a count value of the second determination counter is set to zero (S136), those operation being periodically repeated, and when one of the count values of the first and second determination counters exceeds one of respective predetermined values α and β (S118 and S214), one of the two brake switches 6a and 6b is determined to be failed, which enables detection of a failure state that one of the brake switches is normally ON or normally OFF.

7 Claims, 5 Drawing Sheets

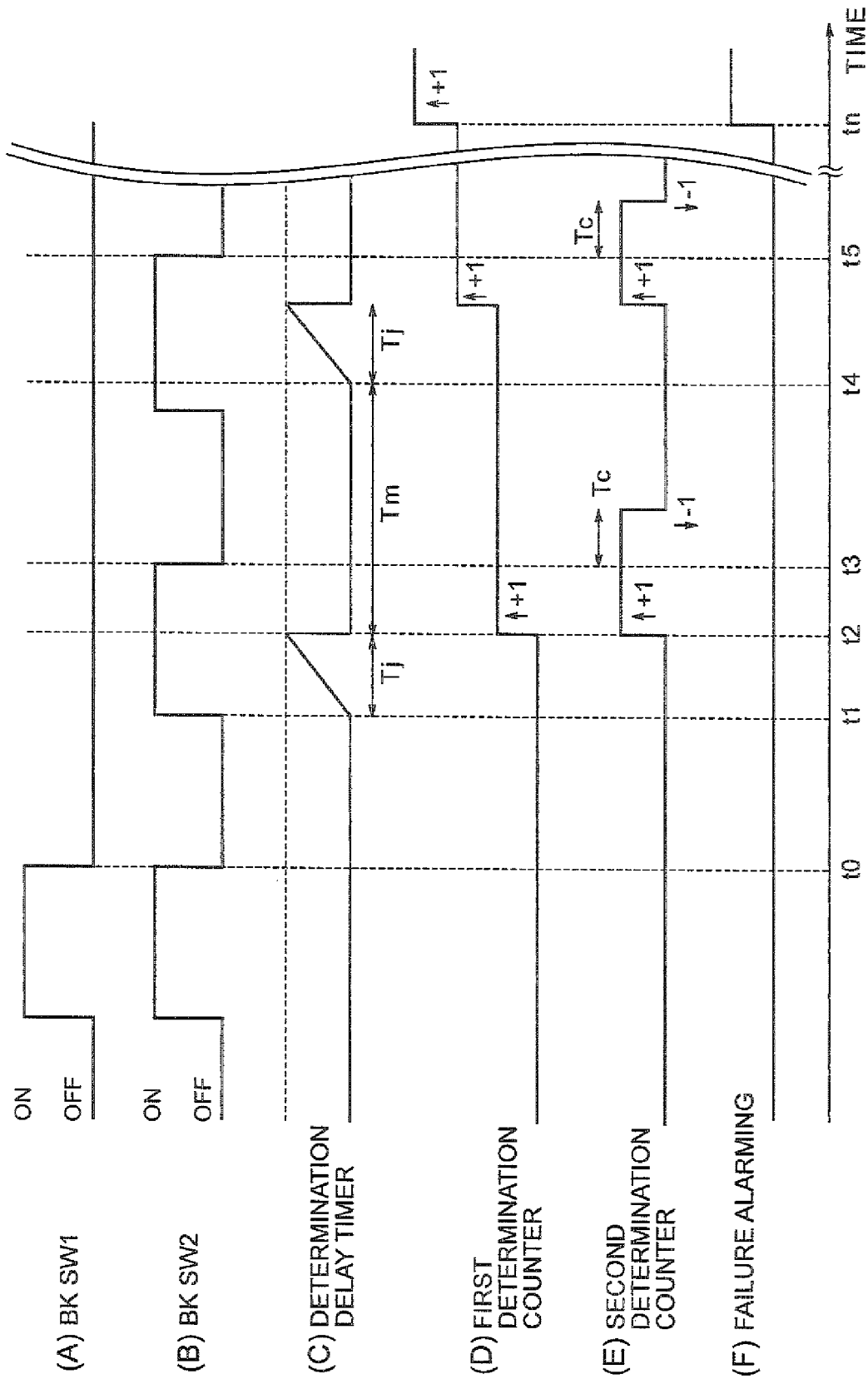

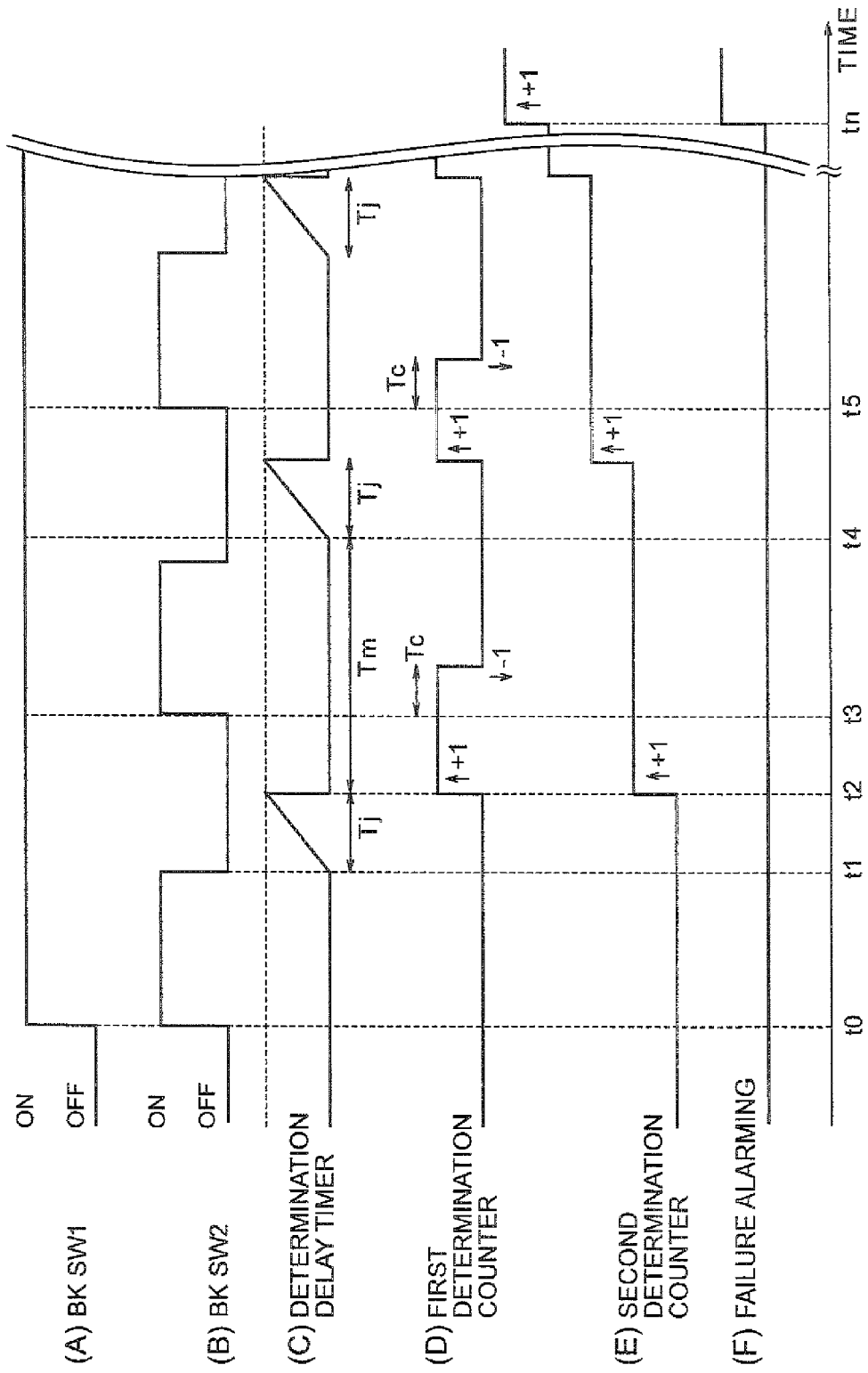

BRAKE-SWITCH FAILURE DIAGNOSIS METHOD AND BRAKE-SWITCH FAILURE DIAGNOSIS SYSTEM

BACKGROUND OF THE INVENTION

1. Field of the Invention

The present invention relates to failure diagnosis of a brake switch for detecting an operation condition of a brake pedal of a vehicle such as motor vehicle, and particularly relates to a method and a system for achieving failure diagnosis with a simple configuration, improved reliability and the like.

2. Description of the Related Art

As this type of system, various systems have been proposed in the past, including a system as shown in Japanese Patent Publication No. 2,772,737, which is configured to synthetically determine the presence of failure of a brake switch from internal pressure of a booster for boosting braking liquid pressure and variation of the internal pressure, brake pedal force applied to a brake pedal, and braking pressure.

However, in the system disclosed in the patent publication, while many determination elements are used and therefore highly reliable diagnosis may be expected, since the system requires a signal depending on booster pressure, and a signal depending on brake pedal force, and furthermore a signal depending on braking pressure, increased number of sensors are required for a vehicle as a whole, in addition, number of wirings is increased, the wirings connecting between the sensors and an electronic control unit performing electronic control of the vehicle. Consequently, the system has not always been acceptable for a vehicle being limited in space for setting components, and desired to have a simple configuration and reduced number of the components to the utmost.

SUMMARY OF THE INVENTION

The invention was made in the light of the circumstances, and provides a brake-switch failure diagnosis method and a brake-switch failure diagnosis system, which enable secure failure diagnosis with a simple configuration.

According to a first aspect of the present invention, a brake-switch failure diagnosis method for detecting an operation condition of a brake pedal is provided, which is configured in such a manner that when two brake switches, which are provided such that an operation condition of a brake pedal may be detected, are detected to be not ON together and not OFF together, first and second determination counters perform count of respective predetermined incremental values, and on the other hand, when the two brake switches are detected to be ON together, a count value of the first determination counter is set to zero, and when the two brake switches are detected to be OFF together, a count value of the second determination counter is set to zero, those operation being periodically repeated, and when the count value of the first determination counter or the count value of the second determination counter is equal to or larger than each predetermined value being beforehand determined, a brake switch is determined to be failed.

According to a second aspect of the present invention, a brake-switch failure diagnosis system for detecting an operation condition of a brake pedal is provided, which includes two brake switches, each outputting a predetermined signal depending on an operation condition of a brake pedal, and an electronic control unit that is inputted with respective output signals from the two brake switches to determine presence of failure of each brake switch, wherein the electronic control unit is configured to operate so that detection is made on a situation that the two brake switches are not ON together and not OFF together, and when such a situation is detected, first and second determination counters perform count of respective predetermined incremental values, and on the other hand, when the two brake switches are detected to be ON together, a count value of the first determination counter is set to zero, and when the two brake switches are detected to be OFF together, a count value of the second determination counter is set to zero, those operation being periodically repeated, and when the count value of the first determination counter or the count value of the second determination counter is equal to or larger than each predetermined value being beforehand determined, a brake switch is determined to be failed.

BRIEF DESCRIPTION OF THE DRAWINGS

FIG. 4 is timing charts illustrating brake-switch failure determination operation in the embodiment of the invention in the case that one of two brake switches is failed into OFF-fixing, where FIG. 4(A) shows a timing chart showing an example of change in output signal from a first brake switch, FIG. 4(B) shows a timing chart showing an example of change in output signal from a second brake switch, FIG. 4(C) shows a timing chart simulatively showing elapsed time in a ramp waveform with timing by a determination delay timer, FIG. 4(D) shows a timing chart simulatively showing change in count value of a first determination counter in a step-like waveform, FIG. 4(E) shows a timing chart simulatively showing change in count value of a second determination counter in a step-like waveform, and FIG. 4(F) shows a timing chart showing a logic signal generated in the case that the first and second brake switches are determined to be failed; and FIG. 5 is timing charts illustrating brake-switch failure determination operation in the embodiment of the invention in the case that one of two brake switches is failed into ON-fixing, where FIG. 5(A) shows a timing chart showing an example of change in output signal from a first brake switch, FIG. 5(B) shows a timing chart showing an example of change in output signal from a second brake switch, FIG. 5(C) shows a timing chart simulatively showing elapsed time in a ramp waveform with timing by a determination delay timer, FIG. 5(D) shows a timing chart simulatively showing change in count value of a first determination counter in a step-like waveform, FIG. 5(E) shows a timing chart simulatively showing change in count value of a second determination counter in a step-like waveform, and FIG. 5(F) shows a timing chart showing a logic signal generated in the case that the first and second brake switches are determined to be failed.

DETAILED DESCRIPTION OF THE PREFERRED EMBODIMENTS

Hereinafter, a preferred embodiment of the invention will be described with reference to FIGS. 1 to 5.

It will be noted that the members and arrangements described below are not intended to limit the present invention and can be variously modified within the scope of the gist of the present invention.

First, a configuration example of a vehicle braking system using a brake-switch failure diagnosis method in the embodiment of the invention is described with reference to FIG. 1.

Figure 1:
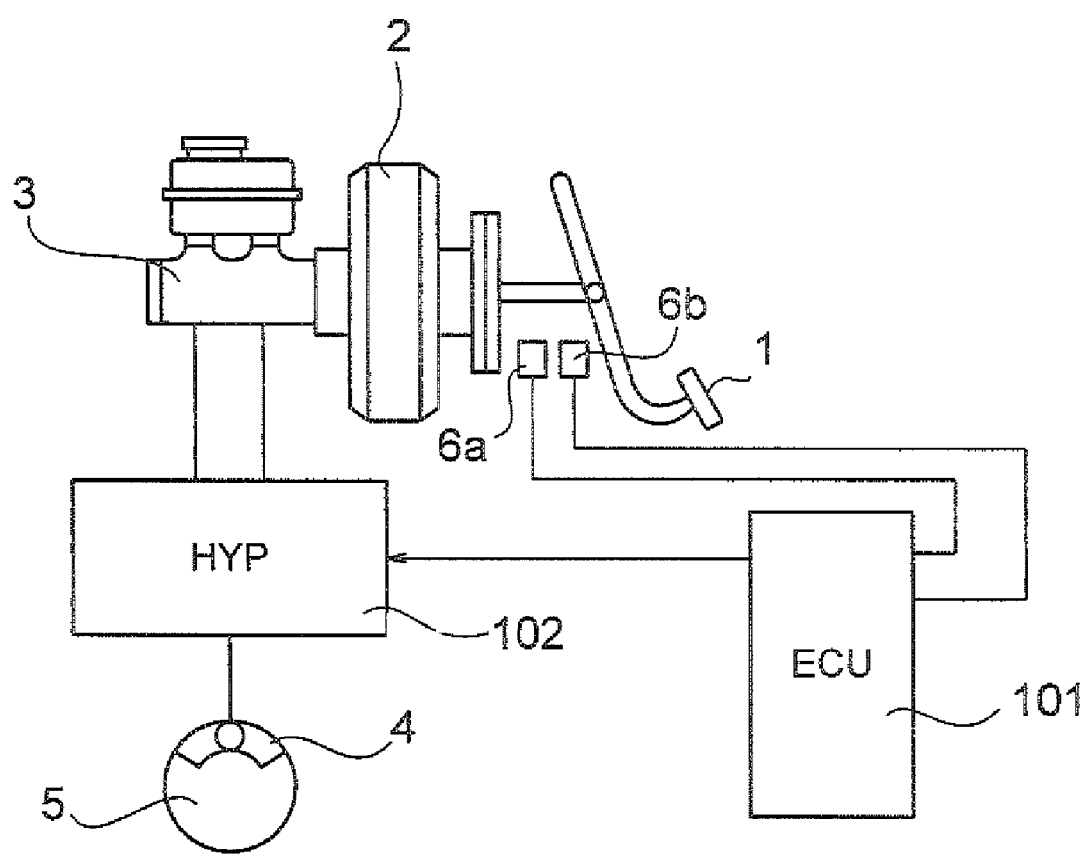
FIG. 1 is a block diagram showing a configuration example of a vehicle braking system using a brake-switch failure diagnosis method of an embodiment of the invention.

FIG. 1 shows a schematic configuration example of vehicle braking system of a four-wheeled motor vehicle, in which depression amount of a brake pedal 1 is converted into hydraulic pressure depending on the depression amount by a brake master cylinder 2. Hydraulic pressure generated in the brake master cylinder 2 is boosted by a booster 3, and the boosted pressure is transmitted to a wheel cylinder 4 as braking pressure via a hydraulic pressure unit (mentioned as "HYP" in FIG. 1) 102, and the wheel cylinder 4 exerts brake force on a wheel 5.

The hydraulic pressure unit 102 has piping (not shown) that connects between the brake master cylinder 2 and the wheel cylinder 4 to circulate a braking liquid between them, an electromagnetic switching valve (not shown) for controlling circulation of the braking liquid, and the like.

In FIG. 1, only one wheel cylinder 4 and only one wheel 5 are shown for simplifying the drawing to facilitate understanding. However, these are actually provided by a number corresponding to the number of wheels respectively.

In the embodiment of the invention, two brake switches 6a and 6b having the same configuration, each of which outputs an ON/OFF signal depending on whether the brake pedal 1 is depressed, are provided at an appropriate place near the brake pedal 1 so that presence of depression of the brake pedal 1 may be detected.

An output signal from each of the brake switches 6a and 6b is inputted into an electronic control unit 101 performing operation control of the braking system and the like.

The electronic control unit 101 is configured to have main components such as a microcomputer (not shown) having a well-known configuration as a core component, storage elements (not shown) such as RAM and ROM, and a drive circuit (not shown) for driving an electromagnetic switching valve (not shown) of the hydraulic pressure unit 102.

Figure 2:
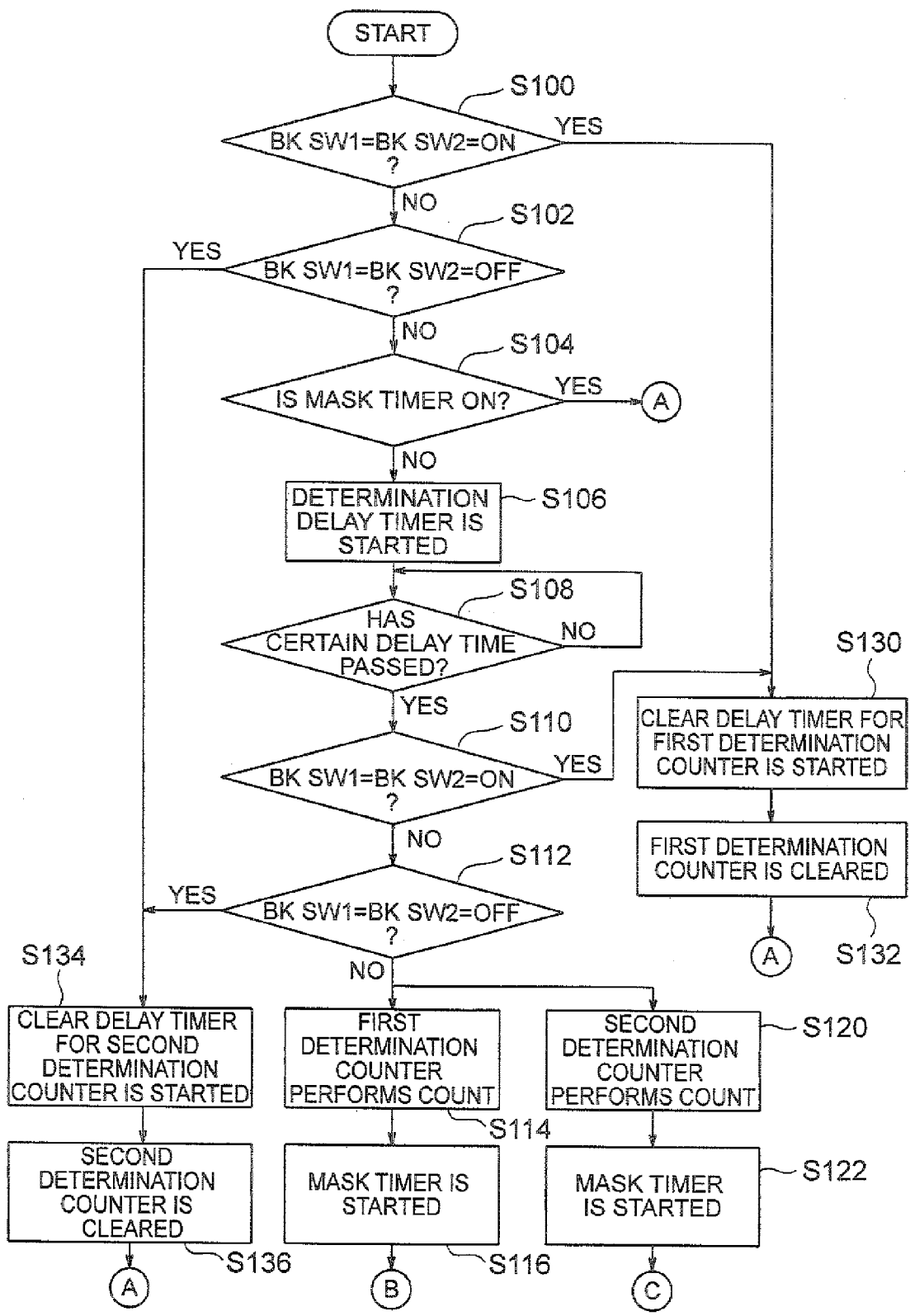
FIG. 2 is a subroutine flowchart showing a specific procedure of switch failure diagnosis processing performed in the vehicle braking system shown in FIG. 1.
Figure 3:
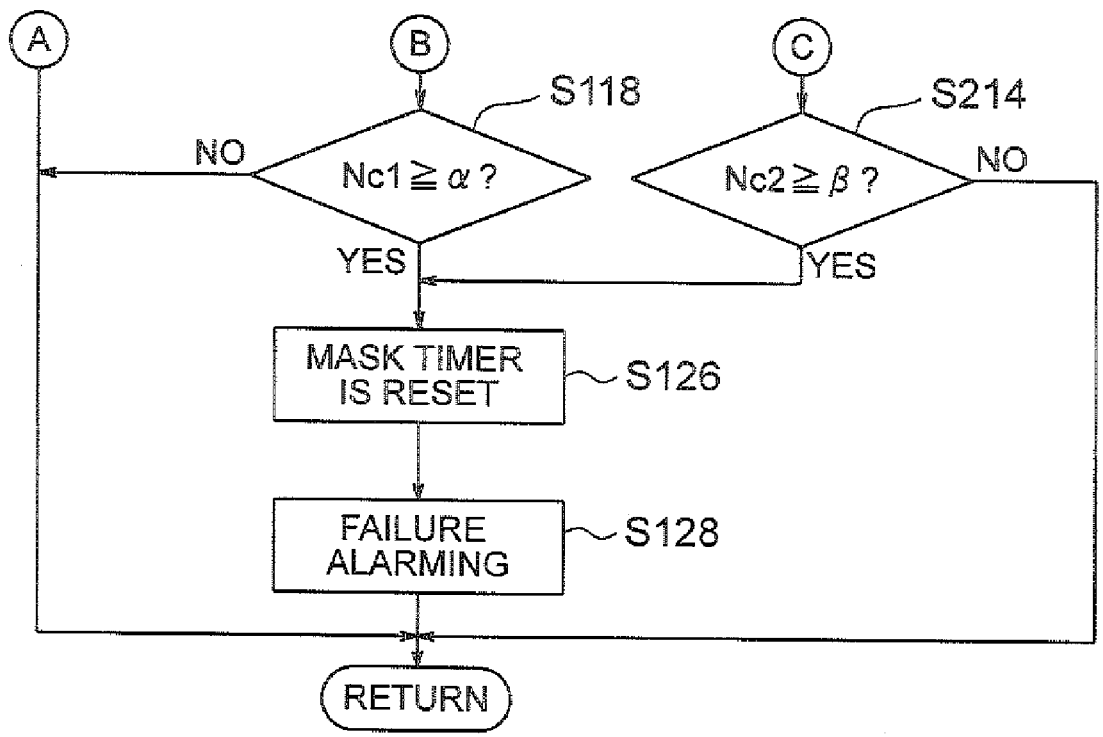
FIG. 3 is a subroutine flowchart showing a procedure of the latter half of the switch failure diagnosis processing shown in FIG. 2.

FIGS. 2 and 3 show flowcharts showing a procedure of brake-switch failure diagnosis processing performed by such an electronic control unit 101 respectively. Hereinafter, the brake-switch failure diagnosis processing of the embodiment of the invention is described with reference to the flowcharts.

First, the brake-switch failure diagnosis processing in the embodiment of the invention is performed as one of various processing for controlling vehicle operation performed by the electronic control unit 101, and therefore performed as subroutine processing.

When the electronic control unit 101 starts the processing, whether output signals from the first and second brake switches 6a and 6b, which are inputted into the electronic control unit 101, are in an ON-state together is determined (refer to step S100 in FIG. 2).

Here, a state of an output signal from the first brake switch 6a is shown as "BK SW1" and a state of an output signal from the second brake switch 6b is shown as "BK SW2" respectively.

In the embodiment of the invention, when the brake pedal 1 is depressed, both the first and second brake switches 6a and 6b are into the ON-state (closing state), and the electronic control unit 101 recognizes that BK SW1=BK SW2=ON is established (or High in logic value). The first and second brake switches 6a and 6b need not necessarily be limited to those that are into the ON-state when the brake pedal 1 is depressed as above, and may have reverse logic, that is, the brake switches may be into an OFF-state when the brake pedal 1 is depressed.

In the step S100, when output signals from the first and second brake switches 6a and 6b are determined to satisfy BK SW1=BK SW2=ON (in the case of YES), the first and second brake switches 6a and 6b are provisionally regarded to be normal, and operation of a clear delay timer for a first determination counter (described in detail later) is started for performing timing of certain time Tc (refer to step S130 in FIG. 2).

When the clear delay timer for the first determination counter completes timing of the certain time Tc, the first determination counter is reset and cleared (refer to step S132 in FIG. 2), and a series of processing is temporarily finished, and processing is returned to a not-shown main routine (refer to FIG. 3).

The clear delay timer is formed using well known, so-called timer software. In this way, timing of the certain time Tc is performed before the first determination counter is cleared. The purpose of this is that when a determination result is given as YES in the step S110 due to noise or the like, the first determination counter is cleared after an operation condition is stabilized so that operation reliability is secured.

On the other hand, in the step S100, when output signals from the first and second brake switches 6a and 6b are determined to not satisfy BK SW1=BK SW2=ON (in the case of NO), processing proceeds to step S102, and whether output signals from the first and second brake switches 6a and 6b are in an OFF-state together is determined in the step S102.

In the step S102, when output signals from the first and second brake switches 6a and 6b are determined to satisfy BK SW1=BK SW2=OFF (in the case of YES), processing of steps S134 and S136 are performed, the processing being essentially the same as processing of the step S130 and S132 as described before.

That is, in the step S134, operation of a clear delay timer for a second determination counter (described in detail later) is started for performing timing of certain time Tc.

When the clear delay timer for the second determination counter completes timing of the certain time Tc, the second determination counter is reset and cleared (refer to step S136 in FIG. 2), and a series of processing is temporarily finished, and processing is returned to the not-shown main routine (refer to FIG. 3).

On the other hand, in the step S102, when output signals from the first and second brake switches 6a and 6b are determined to not satisfy BK SW1=BK SW2=OFF (in the case of NO), whether a mask timer is ON is determined (refer to step S104 in FIG. 2). The mask timer is operated to avoid proceeding to the following step S106 or later for certain time Tm (described in detail later). Since the timer itself is configured by using well known, so-called timer software, detailed description is omitted here.

In the step S104, when the mask timer is determined to be ON, a series of processing is temporarily finished, and processing is returned to the not-shown main routine (refer to FIG. 3).

On the other hand, in the step S104, when the mask timer is determined to be not ON (in the case of NO), processing proceeds to the step S106, and a determination delay timer is started. The determination delay timer is configured by using so-called timer software as the mask timer, and performs timing of certain time Tj.

When it is determined that the determination delay timer completes timing of the certain time Tj (refer to step S108 in FIG. 2), processing proceeds to the step S110, and whether output signals from the first and second brake switches 6a and 6b are in the ON-state together is determined in the step S110 as in the step S100.

In this way, in the embodiment of the invention, when inconsistency is detected between the first and second brake switches 6a and 6b in the step S100 and S102, the brake switches are not immediately determined to be failed, and in the case that the same condition is still detected even after the certain time Tj timed by the determination delay timer has passed, one of the first and second brake switches 6a and 6b is regarded to be possibly failed, and number of occurrence of the condition is counted by the first and second determination counters (refer to step S114 and S120 in FIG. 2).

The purpose of this is that in the case that output signals from the first and second brake switches 6a and 6b are not in the ON-state together, and are not in the OFF-state together, the case being accidentally caused by some reason, or in the case that although output signals from the first and second brake switches 6a and 6b are actually not inconsistent, a signal is falsely inputted into the electronic control unit 101 due to noise or the like, the signal being equivalent to a signal showing that output signals from the first and second brake switches 6a and 6b are not in the ON-state together, or are not in the OFF-state together, the brake switches are avoided from being erroneously determined to be failed, so that reliability of failure determination is secured.

In the step S110, in the case that output signals from the first and second brake switches 6a and 6b are determined to be in the ON-state together (in the case of YES), the first and second brake switches 6a and 6b are provisionally regarded to be normal as in the case that determination is made as YES in the step S100, and processing proceeds to the step S130 as previously described.

On the other hand, in the step S110, in the case that output signals from the first and second brake switches 6a and 6b are determined to be not in the ON-state together (in the case of NO), processing proceeds to the step S112, and whether output signals from the first and second brake switches 6a and 6b are in the OFF-state together is determined.

In the step S112, in the case that output signals from the first and second brake switches 6a and 6b are determined to be in the OFF-state together (in the case of YES), the first and second brake switches 6a and 6b are provisionally regarded to be normal as in the case that determination is made as YES in the step S102, and processing proceeds to the step S134 as previously described.

On the other hand, in the step S112, in the case that output signals from the first and second brake switches 6a and 6b are determined to be not in the OFF-state together (in the case of NO), it is regarded that one of the first and second brake switches 6a and 6b may be failed, resulting in inconsistency between the output signals, and the first and second determination counters perform count operation respectively (refer to steps S114 and S120 in FIG. 2).

In this way, in the embodiment of the invention, when output signals from the first and second brake switches 6a and 6b are determined to be inconsistent, both of the first and second determination counters perform count. However, when output signals from the first and second brake switches 6a and 6b are determined to be in the ON-state together, the first determination counter is cleared (refer to step S132 in FIG. 2), and when output signals from the first and second brake switches 6a and 6b are determined to be in the OFF-state together, the second determination counter is cleared (refer to step S136 in FIG. 2). As a result, unnecessary count operation is not performed.

That is, a counter value Nc1 of the first determination counter is counted by a predetermined incremental value, for example, one (performs count), and a counter value Nc2 of the second determination counter is counted by a predetermined incremental value, for example, one (performs count). In this case, the incremental values of the respective counters may be the same, or different from each other.

In addition, the mask timer starts timing along with the count performed by each of the first and second determination counters (refer to steps S116 and S122 in FIG. 2).

As roughly described before, the mask timer is a software timer provided to avoid processing of the step S106 or later for the certain time Tm after BK SW1=BK SW2=OFF is determined to be not established in the step S112. The purpose of this is that in the case that output signals from the first and second brake switches 6a and 6b are determined to be not in the ON-state together, or not in the OFF-state together, the determination being accidentally made due to some reason, or in the case that although output signals from the first and second brake switches 6a and 6b are actually not in the ON-state together, or actually not in the OFF-state together, a signal is falsely inputted into the electronic control unit 101 due to noise or the like, the signal being equivalent to a signal showing that the output signals are in such an ON or OFF state together, the processing of the step S106 or later is avoided, so that reliability of failure determination is improved.

Then, after the mask timer is started, whether the counter value Nc1 of the first determination counter is equal to or larger than a predetermined value $\alpha$ is determined, and whether the counter value Nc2 of the second determination counter is equal to or larger than a predetermined value $\beta$ is determined (refer to step S118 and S214 in FIG. 3). The predetermined values $\alpha$ and $\beta$ may satisfy $\alpha=\beta$.

Only in the case that the counter value Nc1 of the first determination counter is determined to be equal to or larger than the predetermined value $\alpha$ (YES), or in the case that the counter value Nc2 of the second determination counter is determined to be equal to or larger than the predetermined value $\beta$ (YES) (refer to step S118 and S214 in FIG. 3), one of the first and second brake switches 6a and 6b is regarded to be failed, and the mask timer is forcibly reset even if it is ON (refer to step S126 in FIG. 3), and failure alarming is performed (refer to step S128 in FIG. 3).

For the failure alarming, various methods being generally well known are preferably used, including failure display on a display element or a display apparatus, lighting of a lighting element or the like, rumbling of a rumbling element such as buzzer, and one or a combination of the methods may be optionally used without being limited to a particular method.

In this way, in the brake switch failure diagnosis of the embodiment of the invention, on the assumption that it is extremely rare that the first and second brake switches 6a and 6b are failed to be normally ON together or normally OFF together, a state where one of the brake switches is failed to be normally ON or normally OFF may be detected.

Next, further specific operation is described with reference to timing charts shown in FIGS. 4 and 5, the operation being performed when the brake-switch failure determination processing is performed.

First, in FIG. 4, FIG. 4(A) shows a timing chart showing an example of change in output signal (BK SW1) from the first brake switch 6a, FIG. 4(B) shows a timing chart showing an example of change in output signal (BK SW2) from the second brake switch 6b, FIG. 4(C) shows a timing chart simulatively showing elapsed time in a ramp waveform with timing by the determination delay timer, FIG. 4(D) shows a timing chart simulatively showing change in count value of the first determination counter in a step-like waveform, FIG. 4(E) shows a timing chart simulatively showing change in count value of the second determination counter in a step-like waveform, and FIG. 4(F) shows a timing chart showing a logic signal generated in response to determination that one of the first and second brake switches 6a and 6b is failed in the failure alarming (refer to step S128 in FIG. 3).

FIG. 4 shows an example of failure diagnosis operation when the first brake switch 6a is failed to be normally OFF.

That is, both of the first and second brake switches 6a and 6b are in a normal operation condition before time t0. However, after the time, the first brake switch 6a is normally OFF (refer to FIG. 4(A)).

At time t1, since an output signal from the first brake switch 6a is in the OFF-state, and an output signal from the second brake switch 6b is in the ON-state, it is determined that output signals from the first and second brake switches 6a and 6b are not in the ON-state together, or not in the OFF-state together (refer to steps S100 and S102 in FIG. 2).

Since the mask timer is not ON at a point of the time t1, the determination delay timer is started at the point (refer to steps S104 and S106 in FIG. 2). Then, at time t2 after certain time Tj has passed from the point, determination is newly made on whether the first and second brake switches 6a and 6b are ON together (refer to step S110 in FIG. 2). Since the first brake switch 6a is still OFF, and the second brake switch 6b is still ON at a point of the time t2 (refer to FIGS. 4(A) and 4(B)), determination is made as NO in the step S110, and subsequently determination is newly made on whether the first and second brake switches 6a and 6b are OFF together (refer to step S112 in FIG. 2).

When determination is made as NO even in the step S112, it is regarded that one of the first and second brake switches 6a and 6b is failed, and the first and second determination counters are counted up respectively, and the mask timer is concurrently started (refer to step S114, S120, S116 and S122 in FIG. 2, and FIGS. 4(D) and 4(E)).

Then, while the mask timer is ON, the second brake switch 6b is into the OFF-state at time t3, so that the step S100 and S102 in FIG. 2 are performed even if the mask timer is ON. Therefore, BK SW1=BK SW2=OFF is determined to be established in the S102, so that the second determination counter is cleared after the clear delay timer for the second determination counter finishes timing of certain time Tc (refer to FIG. 4(E)).

Then, the mask timer finishes timing at time t4, and the step S100 is performed at the time. In such a state, since the second brake switch 6b is ON, and the first brake switch 6a is OFF, determination is made as NO, and furthermore determination is made as NO even in the step S102, and the delay timer starts timing.

Then, after the certain time Tj has passed, since determination is made as NO in each of the steps S110 and S102, the first and second determination counters are counted up respectively (refer to FIGS. 4(D) and 4(E)).

Then, the second brake switch 6b is into the OFF-state at time t5, thereby BK SW1=BK SW2=OFF is determined to be established in the S102 as in the case at the time t3 as described before, so that the second determination counter is cleared after the certain time Tc has passed (refer to FIG. 4(E)).

After that, the above operation is repeated in the same way, and when the count value Nc1 of the first determination counter reaches the predetermined value a at time to (refer to FIG. 4(D)), a logic signal having a logic value of High, meaning that one of the first and second brake switches 6a and 6b is failed, is generated in the electronic control unit 101 (refer to FIG. 4(F)) as a trigger signal for failure alarming or the like.

In this way, in the case that one of the first and second brake switches 6a and 6b is failed to be normally OFF, even if the second determination counter temporarily performs count, the counter is always cleared, a count value of the o counter may not reach the predetermined value β.

On the other hand, since output signals from the first and second brake switches 6a and 6b are not in the ON-state together, the first determination counter may repeatedly perform count without being cleared, so that a count value of the counter may reach the predetermined value α, enabling failure determination.

Next, in the case that the first brake switch 6a is failed to be normally ON, failure diagnosis operation is described with reference to FIG. 5.

First, respective objects shown by FIGS. 5(A) to 5(F) are the same as those in FIGS. 4(A) to 4(F) described above.

In FIG. 5, both of the first and second brake switches 6a and 6b are in a normal operation condition before time t0. However, after the time, the first brake switch 6a is normally ON (refer to FIG. 5(A)).

At time t1, since an output signal from the first brake switch 6a is in the ON-state, and an output signal from the second brake switch 6b is in the OFF-state, it is determined that output signals from the first and second brake switches 6a and 6b are not in the ON-state together or not in the OFF-state together (refer to steps S100 and S102 in FIG. 2).

Since the mask timer is not ON at a point of the time t1, the determination delay timer is started at the point (refer to steps S104 and S106 in FIG. 2). Then, at time t2 after certain time Tj has passed from the point, determination is newly made on whether the first and second brake switches 6a and 6b are ON together (refer to step S110 in FIG. 2). Since the first brake switch 6a is still ON, and the second brake switch 6b is still OFF at a point of the time t2 (refer to FIGS. 5(A) and 5(B)), determination is made as NO in the step S110, and subsequently determination is newly made on whether the first and second brake switches 6a and 6b are OFF together (refer to step S112 in FIG. 2).

When determination is made as NO even in the step S112, it is regarded that one of the first and second brake switches 6a and 6b is failed, and the first and second determination counters are counted up respectively, and the mask timer is concurrently started (refer to steps S114, S120, S116 and S122 in FIG. 2, and FIGS. 5(D) and 5(E)).

Then, while the mask timer is ON, the second brake switch 6b is into the ON-state at time t3, so that the step S100 in FIG. 2 is carried out even if the mask timer is ON. Therefore, BK SW1=BK SW2=ON is determined to be established in the step S100, so that the first determination counter is cleared after the clear delay timer for the first determination counter finishes timing of certain time Tc (refer to FIG. 5(D)).

Then, the mask timer finishes timing at time t4, and the step S100 is performed at the time. In such a state, since the first brake switch 6a is ON, and the second brake switch 6b is OFF, determination is made as NO, and furthermore determination is made as NO even in the step S102, and the delay timer starts timing.

Then, after the certain time Tj has passed, since determination is made as NO in each of the steps S110 and S112, the first and second determination counters are counted up respectively (refer to FIGS. 5(D) and 5(E)).

Then, the second brake switch 6b is into the ON-state at time t5, thereby BK SW1=BK SW2=ON is determined to be established in the S100 as in the case at the time t3 as described before, so that the first determination counter is cleared after the certain time Tc has passed (refer to FIG. 5(D)).

After that, the above operation is repeated in the same way, and when the count value Nc2 of the second determination counter reaches the predetermined value β at time tn (refer to FIG. 5(E)), a logic signal having a logic value of High, meaning that one of the first and second brake switches 6a and 6b is failed, is generated in the electronic control unit 101 (refer to FIG. 5(F)) as a trigger signal for failure alarming or the like.

In the embodiment of the invention, detection is made on a situation that the first and second brake switches 6a and 6b are not ON together and not OFF together, and when such a situation is detected, failure is regarded to occur, and count is performed. However, this is not necessarily limitative, and for example, it is acceptable that the two brake switches are reversed in logic, and detection is made on a situation that the brake switches are ON together or OFF together, and when such a situation is detected, failure is regarded to occur, and number of occurrence of the situation is counted.

As described hereinbefore, the brake-switch failure diagnosis method and the brake-switch failure diagnosis system according to the invention are suitably used as one vehicle operation failure diagnosis of a four-wheeled motor vehicle having a dual circuit brake switch.

According to the invention, failure of a brake switch may be determined by using only a signal from the brake switch without using a plurality of signals from sensors other than the brake switch unlike a prior case, in addition, a condition of the brake switch is repeatedly determined several times. Therefore, highly reliable failure determination can be advantageously achieved with a simple configuration, contributing to provide a braking system that achieves highly reliable operation.

In addition, according to the invention, the two brake switches are detected to be not ON together and not OFF together, and the two counters concurrently perform count of such detection, and on the other hand, when the two brake switches are detected to be ON together, one counter is cleared, and when the two brake switches are detected to be OFF together, the other counter is cleared, which enables detection of such failure that one of the two brake switches is normally ON (ON-fixing), or normally OFF (OFF-fixing). Therefore, highly reliable failure determination can be advantageously achieved compared with the prior case, contributing to provide a braking system that achieves highly reliable operation.

What is claimed is:

1. A brake-switch failure diagnosis method for detecting an operation condition of a brake pedal, characterized in that:
when two brake switches, being provided such that an operation condition of a brake pedal may be detected, are detected to be not ON together and not OFF together, first and second determination counters perform count of respective predetermined incremental values, and on the other hand, when the two brake switches are detected to be ON together, a count value of the first determination counter is set to zero, and when the two brake switches are detected to be OFF together, a count value of the second determination counter is set to zero, those operation being periodically repeated, and
when the count value of the first determination counter or the count value of the second determination counter is equal to or larger than each predetermined value being beforehand determined, a brake switch is determined to be failed.

2. The brake-switch failure diagnosis method according to claim 1, characterized in that:
when the two brake switches, being provided such that the operation condition of the brake pedal may be detected, are detected to be not ON together and not OFF together, a determination delay timer times a certain time, and then when the two brake switches are newly detected to be not ON together and not OFF together, the first and second determination counters perform count of respective predetermined incremental values.

3. The brake-switch failure diagnosis method according to claim 2, characterized in that:
when the first and second determination counters perform count respectively, the determination delay timer is prohibited to perform timing for a certain time so that it is avoided that the two brake switches are detected to be not ON together and not OFF together after the determination delay timer completes timing.

4. A brake-switch failure diagnosis program, executed in a brake-switch failure diagnosis system configured to be inputted with output signals from two brake switches for detecting an operation condition of a brake pedal so that failure diagnosis of the brake switches is performed, characterized by having:
a first step that whether the output signals from the two brake switches are in an ON-state together is determined,
a second step that when the output signals from the two brake switches are determined to be in the ON-state together in the first step, a first determination counter is cleared,
a third step that when the output signals from the two brake switches are determined to be not in the ON-state together in the first step, whether the output signals from the two brake switches are in an OFF-state together is determined,
a fourth step that when the output signals from the two brake switches are determined to be in the OFF-state together in the third step, a second determination counter is cleared,
a fifth step that when the output signals from the two brake switches are determined to be not in the OFF-state together in the third step, a determination delay timer performs timing of a certain time,
a sixth step that when the determination delay timer completes the timing of the certain time in the fifth step, whether the output signals from the two brake switches are in the ON-state together is determined,
a seventh step that when the output signals from the two brake switches are determined to be in the ON-state together in the sixth step, the first determination counter is cleared,
an eighth step that when the output signals from the two brake switches are determined to be not in the ON-state together in the sixth step, whether the output signals from the two brake switches are in the OFF-state together is determined,
a ninth step that when the output signals from the two brake switches are determined to be in the OFF-state together in the eighth step, the second determination counter is cleared,
a tenth step that when the output signals from the two brake switches are determined to be not in the OFF-state together in the eighth step, the first and second determination counters perform count of predetermined incremental values being determined respectively, an eleventh step that after the first and second determination counters perform the count respectively in the tenth step, whether count values of the counters are equal to or larger than predetermined values being set respectively is determined, and a twelfth step that when one of the count values is determined to be equal to or larger than the predetermined value in the eleventh step, one of the two brake switches is regarded to be failed, wherein the program is configured such that these steps are periodically repeated.

5. A brake-switch failure diagnosis system for detecting an operation condition of a brake pedal, characterized by having:

two brake switches, each outputting a predetermined signal depending on an operation condition of a brake pedal, and an electronic control unit that is inputted with respective output signals from the two brake switches to determine presence of failure of each brake switch, wherein the electronic control unit is configured to operate so that detection is made on a situation that the two brake switches are not ON together and not OFF together, and when such a situation is detected, first and second determination counters perform count of respective predetermined incremental values, and on the other hand, when the two brake switches are detected to be ON together, a count value of the first determination counter is set to zero, and when the two brake switches are detected to be OFF together, a count value of the second determination counter is set to zero, those operation being periodically repeated, and when the count value of the first determination counter or the count value of the second determination counter is equal to or larger than each predetermined value being beforehand determined, a brake switch is determined to be failed.

6. The brake-switch failure diagnosis system according to claim 5, characterized in that:

the electronic control unit is configured to operate so that when the two brake switches, being provided such that the operation condition of the brake pedal may be detected, are detected to be not ON together and not OFF together, a determination delay timer times a certain time, and then detection is newly made on a situation that the two brake switches are not ON together and not OFF together, and when such a situation is detected, the first and second determination counters perform count of respective predetermined incremental values.

7. The brake-switch failure diagnosis system according to claim 6, characterized in that:

the electronic control unit is configured to operate so that when the first and second determination counters perform count respectively, the determination delay timer is prohibited to perform timing for a certain time so that it is avoided that the two brake switches are detected to be not ON together and not OFF together after the determination delay timer completes timing.

* * * * *